United States Patent
Owejan et al.

(12)

(10) Patent No.: US 8,518,596 B1
(45) Date of Patent: Aug. 27, 2013

(54) LOW COST FUEL CELL DIFFUSION LAYER CONFIGURED FOR OPTIMIZED ANODE WATER MANAGEMENT

(75) Inventors: Jon P. Owejan, Honeoye, NY (US); Paul D. Nicotera, Honeoye Falls, NY (US); Matthew M. Mench, Knoxville, TN (US); Robert E. Evans, Shelton, CT (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/473,104

(22) Filed: May 16, 2012

(51) Int. Cl.
*H01M 8/10* (2006.01)

(52) U.S. Cl.
USPC .......................................... 429/480; 429/532

(58) Field of Classification Search
None
See application file for complete search history.

(56) References Cited

U.S. PATENT DOCUMENTS

| | | |
|---|---|---|
| 4,812,352 A | 3/1989 | Debe |
| 4,940,854 A | 7/1990 | Debe |
| 5,039,561 A | 8/1991 | Debe |
| 5,175,030 A | 12/1992 | Lu et al. |
| 5,238,729 A | 8/1993 | Debe |
| 5,336,558 A | 8/1994 | Debe |
| 5,338,430 A | 8/1994 | Parsonage et al. |
| 5,674,592 A | 10/1997 | Clark et al. |
| 5,879,827 A | 3/1999 | Debe et al. |
| 5,879,828 A | 3/1999 | Debe et al. |
| 6,482,763 B2 | 11/2002 | Haugen et al. |
| 6,770,337 B2 | 8/2004 | Debe et al. |
| 7,419,741 B2 | 9/2008 | Vernstrom et al. |
| 2006/0147781 A1* | 7/2006 | Cai et al. .......................... 429/34 |
| 2007/0054175 A1* | 3/2007 | Maendle et al. ................. 429/40 |
| 2007/0059452 A1 | 3/2007 | Debe et al. |
| 2007/0059573 A1 | 3/2007 | Debe et al. |
| 2007/0082256 A1 | 4/2007 | Debe et al. |
| 2007/0082814 A1 | 4/2007 | Debe et al. |
| 2008/0020261 A1 | 1/2008 | Hendricks et al. |
| 2008/0020923 A1 | 1/2008 | Debe et al. |
| 2008/0143061 A1 | 6/2008 | Steinbach et al. |
| 2008/0145712 A1 | 6/2008 | Pierpont et al. |
| 2009/0104476 A1* | 4/2009 | Ji et al. ............................. 429/12 |
| 2010/0028744 A1 | 2/2010 | Wieser et al. |
| 2010/0028750 A1 | 2/2010 | Ji et al. |
| 2011/0076592 A1* | 3/2011 | Yamauchi et al. ............ 429/480 |

* cited by examiner

*Primary Examiner* — Patrick Ryan
*Assistant Examiner* — Carmen Lyles-Irving
(74) *Attorney, Agent, or Firm* — Dinsmore & Shohl LLP

(57) ABSTRACT

A fuel cell comprises a cathode gas diffusion layer, a cathode catalyst layer, an anode gas diffusion layer, an anode catalyst layer and an electrolyte. The diffusion resistance of the anode gas diffusion layer when operated with anode fuel is higher than the diffusion resistance of the cathode gas diffusion layer. The anode gas diffusion layer may comprise filler particles having in-plane platelet geometries and be made of lower cost materials and manufacturing processes than currently available commercial carbon fiber substrates. The diffusion resistance difference between the anode gas diffusion layer and the cathode gas diffusion layer may allow for passive water balance control.

17 Claims, 7 Drawing Sheets

LOW COST FUEL CELL DIFFUSION LAYER CONFIGURED FOR OPTIMIZED ANODE WATER MANAGEMENT

STATEMENT REGARDING FEDERALLY SPONSORED RESEARCH OR DEVELOPMENT

This invention was sponsored by the government under contract number DE-EE0000470 awarded by the Department of Energy. The government has certain rights in the invention.

BACKGROUND OF THE INVENTION

1. Field of the Invention

The present invention relates generally to an apparatus for controlling flow of gas and water through a fuel cell, and more particularly to an asymmetrical gas diffusion layer arrangement with an anode gas diffusion layer with a higher diffusion resistance than the cathode gas diffusion layer.

2. Background Art

Fuel cells are used as an electrical power source in many applications. In particular, fuel cells are proposed for use in automobiles to replace internal combustion engines. In proton exchange membrane ("PEM") type fuel cells, hydrogen ($H_2$) is supplied as fuel to the anode of the fuel cell, and oxygen is supplied as the oxidant to the cathode. The oxygen can either be in pure form ($O_2$) or air (a mixture of $O_2$, $N_2$, $CO_2$, and other gases). Proton exchange membrane fuel cells typically have a membrane electrode assembly ("MEA") in which a solid polymer membrane has an anode catalyst on one face, and a cathode catalyst on the opposite face. The MEA is sandwiched between a pair of porous gas diffusion layers ("GDL"), which in turn are sandwiched between a pair of non-porous, electrically conductive elements or plates. These plates function as current collectors for the anode and the cathode, and contain appropriate channels and openings formed therein for distributing the fuel cell's gaseous reactants over the surfaces of the respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

Gas diffusion layers play a multifunctional role in proton exchange membrane fuel cells. For example, GDLs act as diffusers for reactant gases traveling to the anode and the cathode layers, while transporting product water to the flow field. GDLs also conduct electrons and transfers heat generated at the MEA to the coolant, and acts as a buffer layer between the soft MEA and the stiff bipolar plates. Among these functions, the water management capability of GDL is critical to enable the highest fuel cell performance. In other words, an ideal GDL would be able to remove the excess product water from an electrode during wet operating conditions or at high current densities to avoid flooding, and also maintains a certain degree of membrane electrolyte hydration to obtain decent proton conductivity during dry operating conditions. The solid electrolyte membrane (such as Nafion®) used in proton exchange membrane fuel cells needs to maintain a certain degree of hydration to provide good proton conductivity. Hydrocarbon based proton exchange membranes, which are emerging as an alternative solid electrolyte for fuel cell applications, have the potential to be cheaper and more favorable (no fluorine release) compared to the fluoropolymer-based solid electrolyte membrane such as Nafion. The hydrocarbon-based solid electrolyte membranes developed to date need a higher degree of hydration in order to achieve decent proton conductivity.

For PEM fuel cells targeting automotive applications, a drier steady state operating condition is favorable, which requires good water retention capability of the GDL to maintain a certain degree of membrane hydration. The fuel cells in automotive applications will also experience wet operating conditions during start up, shut down and in a subfreezing environment.

Many years of research regarding materials that are thin, porous and conductive has resulted in the polyacrylonitrile ("PAN")-based carbon fiber paper used in state-of-the-art PEM fuel cells. However, attempts to use alternate lower cost materials to PAN-based carbon fiber paper has resulted in one or more of the gas diffusion layer functions being adversely affected. One problem which arises when the gas diffusion layer does not function optimally is anode water accumulation which can cause freeze and cold start failures in the current modules. Increasing the anode diffusion resistance can impact water balance and help lessen the occurrence of freeze and cold start failures. However, in the past these low-cost materials were generally considered symmetrically by evaluating performance with the same materials on both the cathode and anode sides of the fuel cell.

SUMMARY OF THE INVENTION

In view of the above and other problems, features of the present invention are included in the present disclosure that enable passive fuel cell water balance. In one form, the passive control of fuel cell water balance takes place by retaining some product water under dry operating conditions, and removing excess product water during wet operating conditions.

According to an embodiment of the present invention, there is provided a fuel cell comprising a cathode gas diffusion layer, a cathode catalyst layer, an anode gas diffusion layer, an anode electrode layer, and an electrolyte in which the diffusion resistance of the anode gas diffusion layer is larger than the diffusion resistance of the cathode diffusion layer when operated with anode fuel According to another embodiment of the present invention, there is provided a fuel cell comprising a cathode gas diffusion layer, a cathode catalyst layer, an anode gas diffusion layer, an anode catalyst layer, and an electrolyte in which the diffusion resistance of the anode gas diffusion layer is larger than the diffusion resistance of the cathode diffusion layer when operated with anode fuel wherein the anode gas diffusion layer comprises filler particles having in-plane platelet geometries.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

DETAILED DESCRIPTION

The following description of the embodiments is merely exemplary in nature and is in no way intended to limit the invention, its application, or uses.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Figure 1:
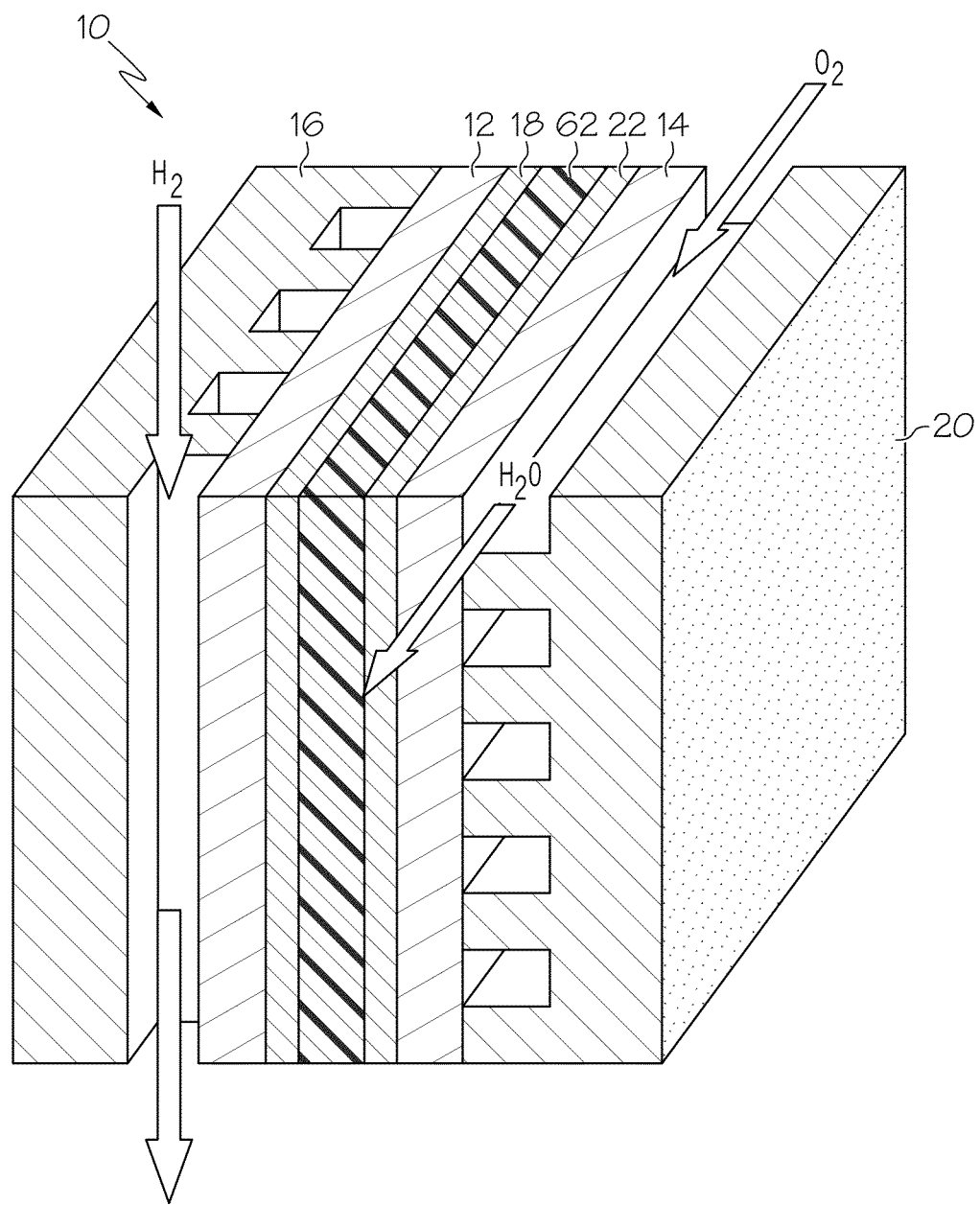
FIG. 1 is a perspective view of a fuel cell incorporating the gas diffusion layers of an embodiment of the present invention.

In at least one embodiment of the invention, an anode gas diffusion layer positionable between a catalyst layer and a flow field in a proton exchange membrane fuel cell is provided. Referring to FIG. 1, a perspective view of a fuel cell incorporating the gas diffusions layers of an embodiment of the present invention is provided. Proton exchange membrane fuel cell 10 includes anode gas diffusion layer 12 and cathode gas diffusion layer 14. Anode gas diffusion layer 12 is positioned between anode flow field 16 and anode catalyst 18 while cathode gas diffusion layer 14 is positioned between cathode flow field 20 and cathode catalyst 22. Further, polymeric ion conductive membrane 62 is positioned between anode catalyst 18 and cathode catalyst 22.

The catalyst layers may be made of any known materials and by any known method to those skilled in the art. For example, platinum nanoparticles supported on carbon supports may be used for catalyst layers. The catalyst layers may also be made of nanostructured thin support materials. The nanostructured thin support materials have particles or thin films of catalyst on them. The nanostructure thin catalytic layers can be made using well known methods. Examples of a method for making nanostructured thin catalytic layers are described in U.S. Pat. Nos. 4,812,352, 4,940,854, 5,039,561, 5,175,030, 5,238,729, 5,336,558, 5,338,430, 5,674,592, 5,879,827, 5,879,828, 6,482,763, 6,770,337, and 7,419,741, and U.S. Publication Nos. 2007/0059452, 2007/0059573, 2007/0082256, 2007/0082814, 2008/0020261, 2008/0020923, 2008/0143061, and 2008/0145712, the contents of which are incorporated herein by reference.

Without wishing to be bound by theory, it is believed, in PEM fuel cells the gas diffusion layer is critical for benchmark performance. This layer has been shown to have several functions. The obvious functions of the gas diffusion layers are related to the land and channel geometry of the bipolar plate network of flow distribution channels, where the gas diffusion layer must provide a diffusion path over the lands and conduction, both electron and thermal, over the channels. The gas diffusion layer must also provide mechanical support such that sufficient contact pressure is applied to the catalyst layer and also so that the gas diffusion layer does not intrude into the channel. An equally important function of the gas diffusion layer is its thermal-diffusive resistance. It is desirable for the gas diffusion layer to insulate the cathode catalyst layer enough such that an optimal thermal gradient will exist. This insulative capacity combined with an appropriate diffusion resistance can provide a diffusive flux that is optimized to minimize flooding and maintain ionomer hydration under wet and dry conditions respectively.

In at least one embodiment of the present invention, there is provided a fuel cell comprising a cathode gas diffusion layer, a cathode catalyst layer, an anode diffusion layer, an anode catalyst layer, and an electrolyte in which the diffusion resistance of the anode gas diffusion layer is significantly higher than the diffusion resistance of the cathode diffusion layer when operated with an anode fuel. In this context, a diffusion resistance which is significantly higher corresponds to a gas diffusion layer with a diffusion resistance which is increased by a multiplying factor such as 2 times, 4 times, or 6 times. In a selected embodiment the diffusion resistance of the anode gas diffusion layer is at least 3 times the diffusion resistance of the cathode gas diffusion layer. In a further selected embodiment the diffusion resistance of the anode gas diffusion layer is at least 5 times the diffusion resistance of the cathode gas diffusion layer.

An anode fuel may be any hydrogen rich fuel known to those skilled in the art as acceptable for use as an anode feed stream in a PEM fuel cell. Non-limiting examples of anode fuels include pure hydrogen, hydrogen and other gas mixtures, and reformed methane.

The utilization of gas diffusion layers for the anode gas diffusion layer and the cathode gas diffusion layer which have disparate properties creates a fuel cell which is termed asymmetric. Conversely, a fuel cell which is symmetric has gas diffusion layers for both the anode gas diffusion layer and the cathode gas diffusion layer which are the same.

Diffusion resistance is a measure of how extensively the gas diffusion layer acts as an impediment to free diffusion. Diffusion resistance is quantitatively measured according to a value associated with $D/D_{eff}$. In the expression $D/D_{eff}$ the D represents the free diffusion coefficient and the $D_{eff}$ represents the effective diffusion coefficient. A diffusion coefficient is a proportionality constant between the molar flux due to molecular diffusion and the gradient in the concentration of the species and is measured in units of length$^2$/time. Specifically, the free diffusion coefficient (D) is the diffusion coefficient in the absence of a porous barrier material. The free diffusion coefficient, hence, represents the highest possible diffusion coefficient as the diffusive movement, and the corresponding flux of the considered gas species and the gas mixtures as a whole are not restricted by a porous material. The effective diffusion coefficient ($D_{eff}$) in contrast describes the diffusion coefficient of the considered gas species in the gas mixtures in the presence of a porous barrier material. A porous material on one hand fills up a portion of the space that normally is accessible for diffusion and a diffusive flux (porosity effect), and on the other hand the pores usually are not straight across the porous material but inclined or wound thereby extending the path length (tortuosity effect). Because of the increased difficulty in diffusion from the porosity effect and the tortuosity effect, the effective diffusion coefficient naturally is smaller than the free diffusion coefficient. Thus, the ratio of the free diffusion coefficient to the effective diffusion coefficient $D/D_{\textit{eff}}$ is a quantitative measure for how extensively the porous medium constitutes an obstacle to the diffusion and diffusive flux. Furthermore, the ratio of the free diffusion coefficient to the effective diffusion coefficient represents a bulk material property independent of the actual thickness of an actual sample and therefore is the appropriate measure to compare the diffusive mass transport resistance of different materials. The overall mass transport resistance, though, depends also on the layer thickness.

The relationship between porosity ($\epsilon$) and tortuosity (i) is provided by the following formula:

$$D/D_{\textit{eff}} = \tau/\epsilon$$

Accordingly, as the porosity decreases and/or the tortuosity increases, the $D/D_{\textit{eff}}$ ratio increases and, thus, the diffusive mass transport resistance for a given layer thickness also increases.

Diffusion resistance is measured with limiting current or more specifically by limiting the oxygen reduction reaction rate with a stoichiometric ratio of 1.0 at the catalyst layer. Using various oxygen and nitrogen gas mixtures, one can determine the diffusion resistance through a GDL based on oxygen flux for a given limiting current by creating conditions where it can be assumed that the reaction is limited only by oxygen flux. In this case, both the activity of oxygen in the channel and in the catalyst layer are known, thus enabling an effective diffusion coefficient to be determined.

Figure 2:
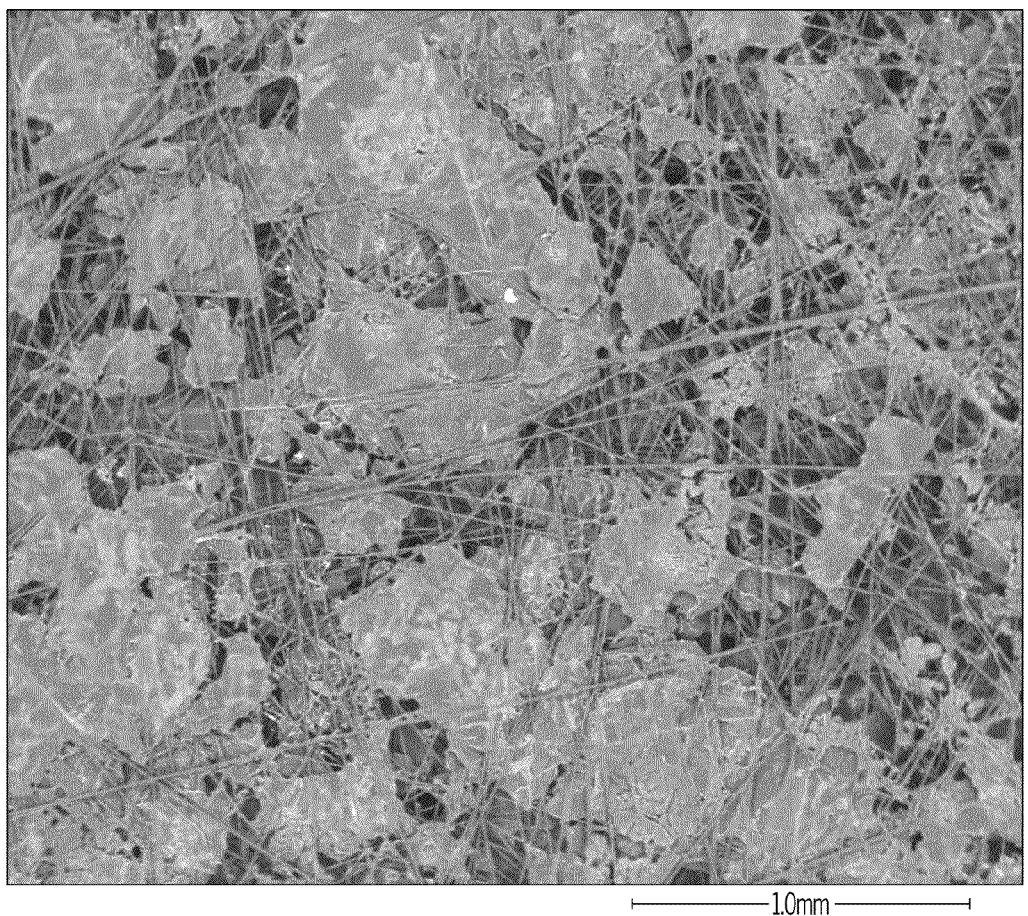
FIG. 2 is a top down scanning electron microscope micrograph of the anode gas diffusion layer of an embodiment of the present invention.
Figure 3:
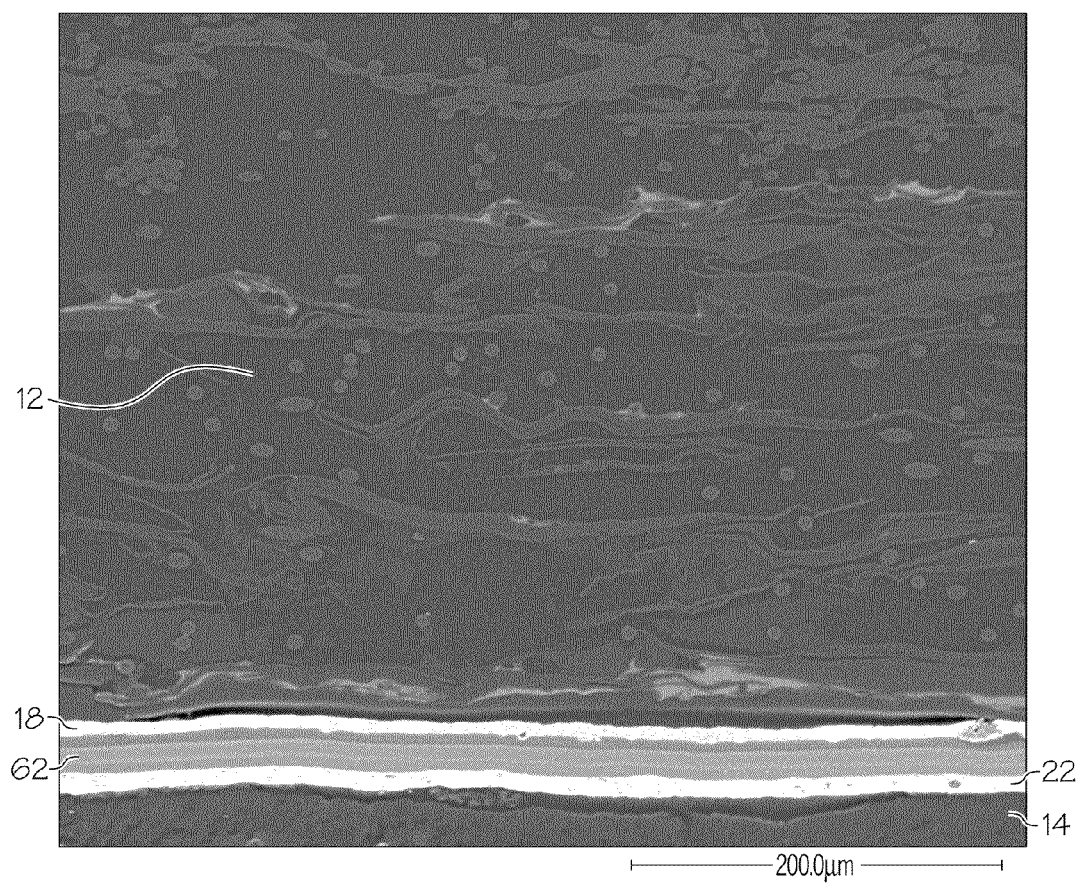
FIG. 3 is a cross-sectional scanning electron microscope micrograph of the anode gas diffusion layer of an embodiment of the present invention as assembled with the membrane electrode assembly.

In at least one embodiment of the present invention, the anode gas diffusion layer comprises filler particles having in-plane platelet geometries. Referring to FIG. 2, a top down scanning electron microscope micrograph of an anode gas diffusion layer, the in-plane platelet geometry can be seen. As shown in FIG. 2 and FIG. 3, in-plane platelet geometries are planar geometries which are substantially coplanar with the layer in which they are disposed. The in-plane platelets impede the diffusion of water vapor through the anode gas diffusion layer resulting in an increased diffusion resistance that reduces cathode-to-anode water vapor transfer. FIG. 3, a cross-sectional scanning electron microscope micrograph of the anode gas diffusion layer of an embodiment of the present invention, also shows the tortuous pathway through the gas diffusion layer as a result of the in-plane platelets. The in-plane platelets increase the effective length of the pathway through the anode gas diffusion layer and represent an increased tortuosity. Without wishing to be bound by theory, it is believed for porous fiber and particle structures it is difficult to achieve a tortuosity greater than 2 based on geometric constraints. However, a fiber paper with platelets oriented in-plane as shown in FIGS. 2 and 3 can increase tortuosity further. The embodiment of the anode gas diffusion substrate in FIGS. 2 and 3 has an increased diffusion resistance by a factor of 6 in comparison with a baseline gas diffusion layer. This is evident in the cross-section image of this material given in FIG. 3, where a diffusion length increase around the platelets by a factor of 6 is probable.

All experiments were executed with carbon fiber substrates that were wet-proofed by dipping in a polytetrafluoroethylene, or PTFE, dispersion (Dupont TE3859 diluted 30:1 with DI water), drying with IR lamps for 10 minutes and sintering for 45 minutes at 300° C. followed by sintering for 20 minutes at 380° C. to obtain 5-10% wt. PTFE in the final, wet-proofed carbon fiber substrate. All samples had a microporous layer ("MPL") applied that was 8:1:1 carbon-to-PTFE-to-FEP ratio, and 30 μm thick. The baseline material for comparative experimentation was Mitsubishi Rayon Co. (MRC) U105 carbon fiber substrate that was wet-proofed as described above.

The anode GDL consists of a wet-laid carbon fiber substrate that is also treated according to the wet-proofing technique as described. It is believed a key to obtaining increased diffusion resistance is the use of a carbon fiber substrate containing graphite platelets that are significantly larger than can be uniformly incorporated using conventional resin/particle saturation techniques. The larger graphite platelets preferably have an average largest in-plane dimension of at least 0.8 mm, more preferably at least 0.9 mm, and even more preferably at least 1.0 mm. The larger graphite platelets preferably have an average shortest in-plane dimension of at least 0.03 mm, more preferably at least 0.05 mm, and even more preferably at least 0.08 mm. An envisioned method of uniformly incorporating the larger graphite platelets is wet-laying all the carbon fiber substrate's raw materials simultaneously, such that the network of platelets and binder materials co-forms within and throughout the carbon fiber scaffold. In at least one embodiment of the present invention, the anode GDL carbon fiber substrate contains less than 25% carbon fiber by mass and/or greater than 50% graphite platelets by mass.

In at least one embodiment of the present invention, the anode gas diffusion layer comprises lower cost materials and manufacturing processes than other currently available commercial carbon fiber substrates. Less PAN fiber content and lower carbonization temperature contribute to a lower cost manufacturing process. In an embodiment of the present invention, the anode GDL contains about half the mass of carbon fiber as the baseline material per unit area. Carbon fiber is one of the most expensive raw materials involved in manufacturing GDL. Additionally, the maximum temperature used to heat treat the carbon fiber substrate and carbonize the binder materials of the anode GDL of the present invention is below 1000° C., which is believed to be significantly lower than the maximum heat treatment temperatures used for any commercial GDL carbon fiber substrate. The carbonization process is one of the most energy intensive, and therefore costly, steps involved in manufacturing GDL. The use of large graphite particles enhances electrical conductivity, which enables a lower carbon fiber concentration and reduced carbonization temperature. Additionally, the anode GDL fabrication of the present invention also does not require a resin saturation step which is usually needed to incorporate binder material into the carbon fiber substrate of commercial GDL, thus further reducing manufacturing cost.

In at least one embodiment of the present invention, the thermal resistance of the anode gas diffusion layer and the thermal resistance of the cathode gas diffusion layer are similar. In a selected embodiment, the thermal resistance of the anode gas diffusion layer and the thermal resistance of the cathode gas diffusion layer are within 4 $cm^2K/W$ of the other. In a further selected embodiment, the thermal resistance of the anode gas diffusion layer and the thermal resistance of the cathode gas diffusion layer are within 6 $cm^2K/W$ of the other. A difference of 0 to approximately 10 $cm^2K/W$ is an acceptable difference in the thermal resistance between the anode gas diffusion layer and the cathode gas diffusion layer.

Similar thermal resistance between the anode gas diffusion layer and the cathode gas diffusion layer is important to optimal operation of the fuel cell. Similar thermal resistance is important because inconsistent thermal resistance can lead to flooding or drying of the cell and improper water management. Also, an operating PEM fuel cell is not isothermal as heat is generated within the membrane electrode assembly.

The membrane electrode assembly can be considered insulated by the gas diffusion layers leading to temperature gradients within the fuel cell. Similar thermal resistivity between the anode gas diffusion layer and the cathode gas diffusion layer allows this heat to dissipate more evenly.

The magnitude of thermal resistance of the anode gas diffusion layer and cathode diffusion layer is also important to optimal fuel cell operation. As indicated, an operating PEM fuel cell is not isothermal and heat is generated within the membrane electrode assembly which must be dissipated through the gas diffusion layers. Seeing that all flow fields are the same temperature making the bipolar plate temperature a constrained value it is important for the gas diffusion layers to have a thermal resistance low enough to allow heat generated by the MEA to dissipate. In at least one embodiment of the present invention, the thermal resistance of the anode gas diffusion layer and the thermal resistance of the cathode gas diffusion layer are each in the range of approximately 5 $cm^2K/W$ to approximately 10 $cm^2K/W$.

Thermal resistance was calculated by measuring heat flow through a sample with a heat flow meter (Anter Unitherm 2022) as the sample was compressed between a heated plate and a cooled plate. A guard heater surrounded the system to facilitate one dimensional heat flux through the sample, from the hotter plate to the colder plate.

In at least one embodiment of the present invention, the electrical resistance of the anode gas diffusion layer and the electrical resistance of the cathode gas diffusion layer are below a threshold value. In a selected embodiment, the electrical resistance of the anode gas diffusion layer and the electrical resistance of the cathode gas diffusion layer are less than 35 mOhm $cm^2$ at 0.6 MPa. In a further selected embodiment, the electrical resistance of the anode gas diffusion layer and the electrical resistance of the cathode gas diffusion layer are less than 30 mOhm $cm^2$ at 0.6 MPa.

In at least one embodiment of the present invention, the electrical resistance of the anode gas diffusion layer and the electrical resistance of the cathode gas diffusion layer are similar. In a selected embodiment, the electrical resistance of the anode gas diffusion layer and the electrical resistance of the cathode gas diffusion layer are within 20 mOhm $cm^2$ of the other at 0.6 MPa. In a further selected embodiment, the electrical resistance of the anode gas diffusion layer and the electrical resistance of the cathode gas diffusion layer are within 8 mOhm $cm^2$ of the other at 0.6 MPa.

It is generally desirable to minimize electrical resistance in a gas diffusion layer. A higher electrical resistance results in an increase in the ohmic overpotential. The increased ohmic overpotential results in a less efficient fuel cell operation with a lower output voltage.

Electrical resistance was measured by placing a sample of the GDL between two graphite plates, compressing the sample to various pressures, and measuring the voltage drop through the material while flowing 1 $A/cm^2$ of current through the sample.

In at least one embodiment of the present invention, the stiffness and compressibility of the anode gas diffusion layer and the cathode gas diffusion layer are similar. In a selected embodiment, the compressibility of the anode gas diffusion layer and the cathode gas diffusion layer are within 25% strain of each other at 2.07 MPa compressive stress. A difference of 0 to approximately 25% strain at 2.07 MPa compressive stress is an acceptable difference in the compressibility between the anode gas diffusion layer and the cathode gas diffusion layer.

Similar stiffness and compressibility between the anode gas diffusion layer and the cathode gas diffusion layer is important for optimal operation of the fuel cell. Stiffness is believed to be important for maintaining even pressure at the MEA surface and for reducing GDL intrusion into the gas flow channels. It is also believed, similar compressibility of the anode gas diffusion layer to the baseline GDL is important because compression of a gas diffusion layer modifies properties of the gas diffusion layer. One such property is diffusion resistance which would vary as compression would reduce the overall thickness of the gas diffusion layer but would also reduce the porosity of the remaining thickness.

Compressibility was calculated by measuring displacement as a function of load of a one-inch diameter GDL sample placed between carefully paralleled steel plates and compressed at a rate of 2 mm/min. The compressive load may be measured by a load cell, 5 kN load cell for example, and the displacement may be measured with two extensometers placed on either side of the plates, spanning across the sample.

The asymmetrical configuration of the gas diffusion layers in the present invention with a low cost and high diffusion resistance diffusion layer used for the anode gas diffusion layer and a baseline diffusion layer used for the cathode gas diffusion layer is at the heart of the present invention. Utilization of the low cost and high diffusion resistance diffusion layer for both the anode gas diffusion layer and the cathode diffusion layer has been experimentally shown to not perform as well as baseline diffusion layers for both the anode and cathode or a baseline diffusion layer for the cathode in conjunction with a high diffusion resistance diffusion layer for the anode.

Figure 4A:
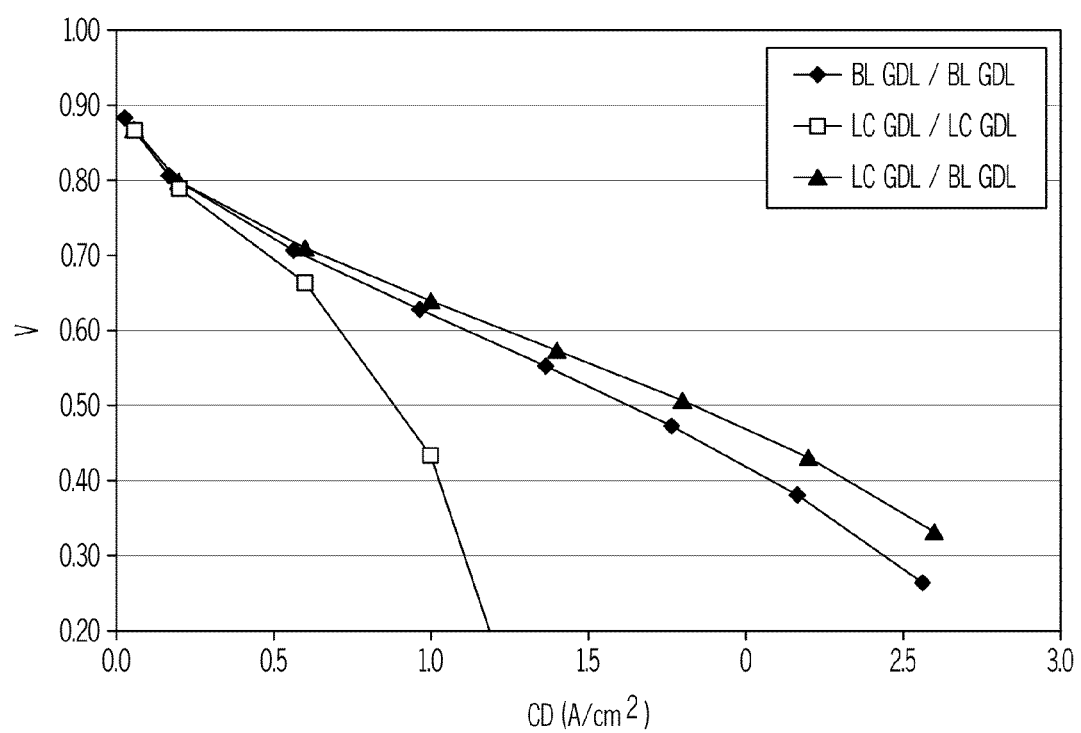
FIG. 4a is a plot of the relationship between voltage and current density in an embodiment of the present invention and comparative examples under dry conditions.
Figure 4B:
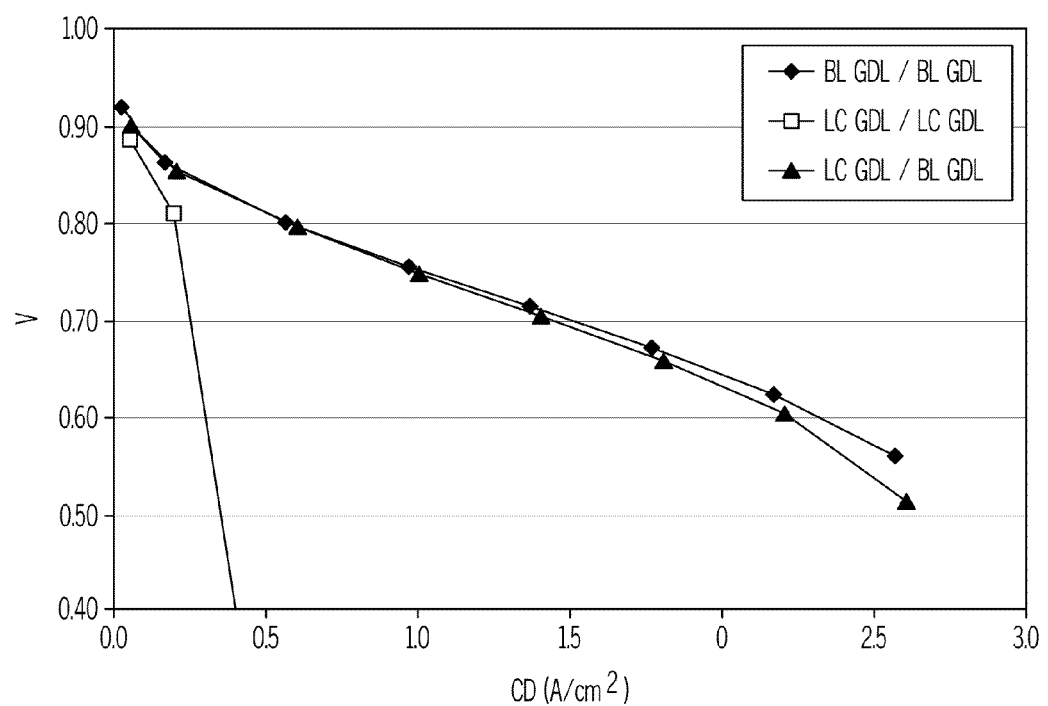
FIG. 4b is a plot of the relationship between voltage and current density in an embodiment of the present invention and comparative examples under wet conditions.

In at least one embodiment of the present invention the output voltage of a fuel cell comprised of a high diffusion resistance gas diffusion layer for the anode gas diffusion layer and a baseline gas diffusion layer for the cathode gas diffusion layer is within 10% of a comparative fuel cell comprising the baseline gas diffusion layer for both a comparative anode gas diffusion layer and a comparative cathode gas diffusion layer for current densities from approximately 0 $A/cm^2$ to approximately 2.5 $A/cm^2$. Referring to FIGS. 4a and 4b it is shown that utilization of the baseline gas diffusion layer (BL GDL) for the cathode gas diffusion layer and the low cost and high diffusion resistance gas diffusion layer (LC GDL) for the anode gas diffusion layer results in voltage outputs within 10% of a fuel cell utilizing the baseline gas diffusion layer for both the anode and cathode gas diffusion layers. For both FIGS. 4a and 4b, the Y-axis represents voltage (V) in units of volts and the X-axis represents current density (CD) in units of $A/cm^2$. However, utilization of the low cost and high diffusion resistance gas diffusion layer for both the anode and cathode gas diffusion layers results in sub-par fuel cell performance. Specifically, FIG. 4a illustrates the similar performance when a fuel cell is operated with $H_2$ and air under dry conditions of approximately 70° C., approximately 60% relative humidity and approximately 101 kPa abs. In fact, under dry conditions the fuel cell performance is improved when the low cost and high diffusion resistance gas diffusion layer is used only as the anode gas diffusion layer. Without wishing to be bound by theory, the improved performance is attributable to the restriction of water removal from the anode gas. FIG. 4b illustrates the similar performance for symmetrical and asymmetrical anode/cathode gas diffusion layers when a fuel cell is operated with $H_2$ and air under wet conditions of approximately 70° C., approximately 100% relative humidity and approximately 300 kPa abs.

Figure 5:
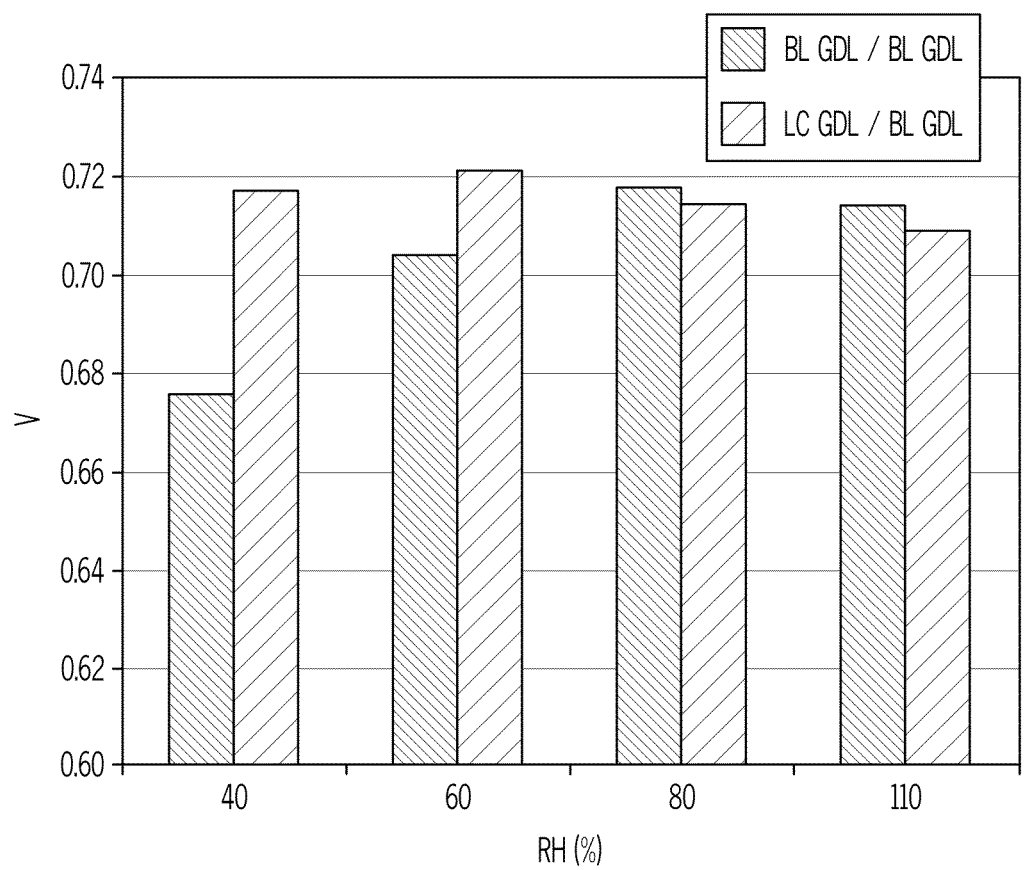
FIG. 5 is a plot of the relationship between voltage and inlet relative humidity in an embodiment of the present invention and comparative example.

In at least one embodiment of the present invention, the output voltage at 1.5 $A/cm^2$ of a fuel cell comprised of a high diffusion resistance gas diffusion layer for the anode gas diffusion layer and a baseline gas diffusion layer for the cathode gas diffusion layer vary by less than 5% for inlet relative humidity percentages of 40, 60, 80 and 100%. In another embodiment, the output voltage at 1.5 A/cm$^2$ of the fuel cell varies by less than 3% for inlet relative humidity percentages of 40, 60, 80 and 100%. This consistent output voltage is illustrated in FIG. 5. The Y-axis of FIG. 5 represents the voltage (V) at 1.5 A/cm$^2$ in units of volts and the X-axis represents inlet relative humidity (RH) as a percentage. The data of FIG. 5 was collected using H$_2$ and air for the inlet streams, at 70° C., and 300 kpa abs. The comparatively lower performance when the baseline gas diffusion layer is used for both the anode gas diffusion layer and the cathode gas diffusion layer is apparent from FIG. 5 as well.

The reduced sensitivity of performance based on inlet relative humidity for the asymmetrical configuration disclosed by at least one embodiment of the present invention is very appealing from a fuel cell system design perspective. Minimizing fuel cell performance fluctuation as a result of fluctuating inlet relative humidity simplifies control systems for the fuel cell system. Fuel cell systems typically have a water vapor transfer ("WTV") device and/or cathode humidification unit ("CHU") integrated to correct and account for fluctuations in the humidity levels of feed streams. The improved passive water balance of the asymmetrical fuel cell arrangement of at least one embodiment of the present invention lessens the dependence on the WTV device and/or CHU. It is further envisioned that in conjunction with at least one embodiment of the present invention the humidity adjustment systems may be eliminated completely.

Figure 6:
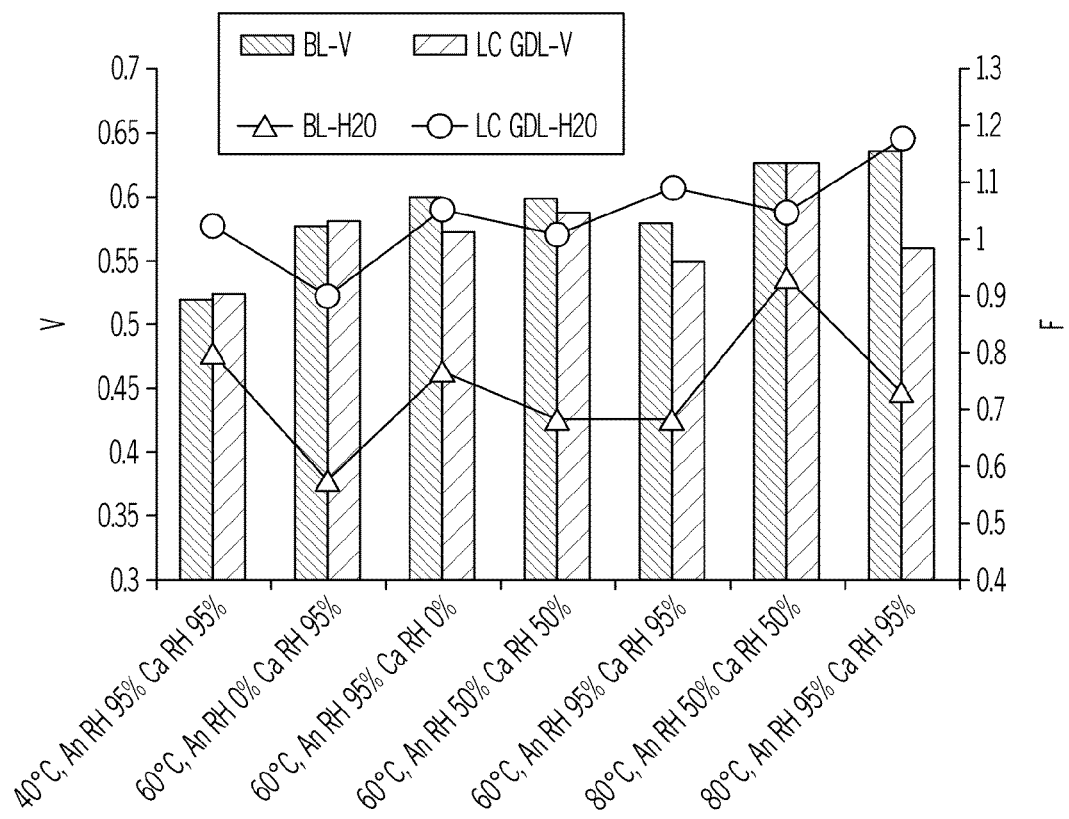
FIG. 6 is a plot of the water balance between the anode outlet and cathode outlet in an embodiment of the present invention and comparative example.

In at least one embodiment of the present invention the asymmetry between the anode gas diffusion layer and cathode gas diffusion layer allows for a significant shift in water balance between the anode outlet and cathode outlet. The water balance between the anode outlet and the cathode outlet may be shifted by at least 20% of product water on average toward the cathode outlet when the asymmetrically configured fuel cell is compared to a comparative fuel cell comprising the baseline gas diffusion layer for both a comparative anode gas diffusion layer and a comparative cathode gas diffusion layer. In another embodiment the water balance may be shifted by at least 30% of product water on average toward the cathode outlet. Referring to FIG. 6, the water balance shift for the symmetrical arrangement with baseline gas diffusion layers for both the anode and cathode gas diffusion layers (Baseline Control or BL) and the asymmetrical arrangement with a baseline gas diffusion layer for the cathode gas diffusion layer and a high diffusion resistance gas diffusion layer for the anode gas diffusion layer (LC GDL) is shown. The Y-axis represents the potential in units of volts at 1.5 A/cm$^2$ labeled as V and the fraction of reaction water in cathode outlet (F). Further, the x-axis represents different operating conditions where An RH is the anode relative humidity and Ca RH is the cathode relative humidity. Without wishing to be bound by theory, the shift in water balance to the cathode outlet is believed to be the result of less reaction water going to the anode through the membrane from the cathode.

The shift in water balance away from the anode is beneficial to fuel cell operation. In fuel cell systems, anode water can reduce efficiency and cause freeze issues. This benefit is especially utilized when a fuel cell utilizing the asymmetrical diffusion resistance between the anode gas diffusion layer and cathode gas diffusion layer is integrated into a vehicle as the source of motive power. Vehicles are stored in less than ideal environmental conditions for optimum fuel cell operation and reducing anode water lessens the detrimental result of freeze and cold start failures.

While certain representative embodiments and details have been shown for purposes of illustrating the invention, it will be apparent to those skilled in the art that various changes may be made without departing from the scope of the invention, which is defined in the appended claims.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention, and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Throughout this application, where publications are referenced, the disclosures of these publications in their entireties are hereby incorporated by reference into this application to more fully describe the state of the art to which this invention pertains.

What is claimed is:

1. A fuel cell comprising:
   a cathode gas diffusion layer;
   a cathode catalyst layer;
   an anode gas diffusion layer comprising a carbon fiber substrate comprising filler particles having in-plane platelet geometries;
   an anode catalyst layer; and
   an electrolyte in contact with the anode catalyst layer and the cathode catalyst layer to facilitate proton flow there between;
   wherein the in-plane platelet geometries have an average largest in-plane dimension of at least 1.0 mm and
   the diffusion resistance of the anode gas diffusion layer when operated with anode fuel for the anode feed stream is significantly higher than the diffusion resistance of the cathode gas diffusion layer.

2. The fuel cell of claim 1 wherein, the diffusion resistance of the anode gas diffusion layer when operated with anode fuel for the anode feed stream is at least 5 times higher than the diffusion resistance of the cathode gas diffusion layer.

3. The fuel cell of claim 1 wherein, the thermal resistance of the cathode gas diffusion layer and the thermal resistance of the anode gas diffusion layer are within 6 cm$^2$K/W of the other.

4. The fuel cell of claim 1 wherein, the thermal resistance of the cathode gas diffusion layer and the thermal resistance of the anode gas diffusion layer are each in the range of approximately 5 cm$^2$K/W to approximately 10 cm$^2$K/W.

5. The fuel cell of claim 1 wherein, the electrical resistance of the cathode gas diffusion layer and the electrical conductivity of the anode gas diffusion layer are each less than 35 mOhm cm$^2$ at 0.6 MPa of compression.

6. The fuel cell of claim 1 wherein, the strain of the anode gas diffusion layer and the strain of the cathode gas diffusion layer are within 25% of each other when subjected to a compressive stress of about 2.07 MPa.

7. The fuel cell of claim 1 wherein, a carbonization temperature of the carbon fiber substrate is below 1000° C.

8. The fuel cell of claim 1 wherein, the carbon fiber substrate comprises less than 25% carbon fiber by mass.

9. The fuel cell of claim 1 wherein, the carbon fiber substrate is wet-laid.

10. The fuel cell of claim 1 wherein, the filler particles are graphite platelets and the carbon fiber substrate comprises greater than 50% graphite platelets by mass.

11. The fuel cell of claim 1 wherein, the in-plane platelet geometries have an average shortest in-plane dimension of at least 0.05 mm.

12. The fuel cell of claim 1 wherein, the output voltage at 1.5 A/cm$^2$ of the fuel cell varies by less than 5% for inlet relative humidity percentages of 40, 60, 80 and 100%.

13. The fuel cell of claim 1 wherein, the fuel cell further comprising an anode outlet and a cathode outlet has a water balance between the anode outlet and the cathode outlet shifted by at least 20% when compared to a comparative fuel cell comprising the cathode gas diffusion layer for both a comparative anode gas diffusion layer and a comparative cathode gas diffusion layer.

14. The fuel cell of claim 1 wherein, the fuel cell is configured for passive water balance.

15. A vehicle comprising the fuel cell of claim 1, wherein the fuel cell serves as a source of motive power for the vehicle.

16. A fuel cell comprising:
an anode gas flow field having one or more channels for introducing a first gas to the fuel cell;
an anode gas diffusion layer in contact with the anode gas flow field;
an anode catalyst layer in contact with the anode gas diffusion layer;
a polymeric ion conductive membrane in contact with the anode catalyst layer;
a cathode catalyst layer in contact with the polymeric ion conductive membrane;
a cathode gas diffusion layer in contact with the cathode catalyst layer;
a cathode gas flow field having one or more cathode plane channels for introducing a second gas to the fuel cell, the cathode flow field being cooperative with the cathode diffusion layer;
wherein the diffusion resistance of the anode gas diffusion layer when operated with anode fuel for the anode feed stream is substantially higher than the diffusion resistance of the cathode gas diffusion layer, thermal resistance of the cathode gas diffusion layer and the thermal resistance of the anode gas diffusion layer are each in the range of approximately 5 cm$^2$K/W to approximately 10 cm$^2$K/W, the electrical resistance of the cathode gas diffusion layer and the electrical resistance of the anode gas diffusion layer are each less than 35 mOhm cm$^2$ at 0.6 MPa of compression, and the anode gas diffusion layer comprises a carbon fiber substrate comprising filler particles having in-plane platelet geometries with an average largest in-plane dimension of at least 1.0 mm.

17. The fuel cell of claim 16 wherein, a carbonization temperature of the carbon fiber substrate is below 1000° C.; the carbon fiber substrate comprises less than 25% carbon fiber by mass; and
an average shortest in-plane dimension of at least 0.05 mm.

* * * * *